United States Patent
Fischer

(10) Patent No.: US 7,134,704 B2
(45) Date of Patent: Nov. 14, 2006

(54) DASHBOARD SUPPORT WITH SINGLE-MASS OSCILLATION FOR VIBRATION DAMPING

(75) Inventor: Jochem Fischer, Ostfildern (DE)

(73) Assignee: Benteler Automobiltechnik GmbH, Paderborn (DE)

( * ) Notice: Subject to any disclaimer, the term of this patent is extended or adjusted under 35 U.S.C. 154(b) by 94 days.

(21) Appl. No.: 11/054,619

(22) Filed: Feb. 9, 2005

(65) Prior Publication Data

US 2005/0206184 A1    Sep. 22, 2005

(30) Foreign Application Priority Data

Mar. 17, 2004   (DE)   ................. 10 2004 013 342

(51) Int. Cl.
*B62D 26/14*   (2006.01)
(52) U.S. Cl. ......................................... 296/72; 280/780
(58) Field of Classification Search ................. 296/72, 296/1.03; 280/779, 780
See application file for complete search history.

(56) References Cited

U.S. PATENT DOCUMENTS

| | | | | |
|---|---|---|---|---|
| 1,572,519 A | * | 2/1926 | Wright | ......................... 280/780 |
| 4,517,854 A | * | 5/1985 | Kawabata et al. | ........... 280/780 |
| 4,838,107 A | * | 6/1989 | Herrmann | ..................... 74/411 |
| 6,138,996 A | * | 10/2000 | Hayashi et al. | ............. 267/136 |
| 6,494,444 B1 | * | 12/2002 | Hasegawa | ................... 267/136 |
| 6,572,178 B1 | * | 6/2003 | Hartel et al. | ........... 296/193.02 |
| 6,733,039 B1 | * | 5/2004 | Honda et al. | ................ 280/780 |
| 2005/0279909 A1 | * | 12/2005 | Fischer | ........................ 248/559 |
| 2005/0284713 A1 | * | 12/2005 | Fischer | ........................ 267/136 |

FOREIGN PATENT DOCUMENTS

| | | |
|---|---|---|
| DE | 39 39 822 | 6/1991 |
| DE | 197 25 770 | 12/1998 |
| DE | 199 18 014 A1 | 11/2000 |
| DE | 101 12 738 | 3/2001 |
| EP | 1 162 124 A | 12/2001 |
| JP | 2-225 839 | 9/1990 |
| WO | WO 88/05506 A | 7/1988 |
| WO | WO 02/08045 A | 1/2002 |

* cited by examiner

*Primary Examiner*—Kiran B. Patel
(74) *Attorney, Agent, or Firm*—Henry M. Feiereisen

(57) ABSTRACT

A dashboard support for a motor vehicle includes a support beam extending between windshield pillars of a motor vehicle body; and an active arrangement for implementing a vibration damping. The active arrangement includes a single-mass oscillator which is arranged on the support beam in an attachment area of a steering column and has a housing in which a mass body is spatially movable and resiliently suspended. The mass body can be caused to vibrate by actuators in the form of piezo elements.

6 Claims, 1 Drawing Sheet

DASHBOARD SUPPORT WITH SINGLE-MASS OSCILLATION FOR VIBRATION DAMPING

CROSS-REFERENCES TO RELATED APPLICATIONS

This application claims the priority of German Patent Application, Serial No. 10 2004 013 342.5, filed Mar. 17, 2004, pursuant to 35 U.S.C. 119(a)–(d).

BACKGROUND OF THE INVENTION

The present invention relates, in general, to a dashboard for a motor vehicle, and in particular to a dashboard support placed transversely between windshield pillars of the vehicle body.

Nothing in the following discussion of the state of the art is to be construed as an admission of prior art.

A dashboard support typically includes a support beam, e.g. a tube which is placed between the windshield pillars. In the area of the cockpit, various mountings are provided on the dashboard for retaining the instrument panel as well as further vehicle components, such as vehicle heating, ventilating and air conditioning system, airbag, steering column, center console, fuse box or glove compartment. The dashboard support is intended to satisfy several functions. Apart from reinforcing the vehicle body to absorb energy, the dashboard support should be able to absorb energy in the event of a collision and should be able to connect various spatial points and allow attachment of various mountings. In addition, the dashboard support should be suitable for operation in different frequency ranges because various vibrations are experienced during travel, as a consequence of e.g. excited undercarriage or engine. German Pat. No. 101 12 738 C1 describes an active arrangement for vibration damping by positioning piezo elements in the attachment area between the windshield pillars and the support beam as well as in the attachment area of the steering column on the support beam. Vibration of the dashboard support during travel is determined by sensors and damped by actively applying a compensating vibration.

German Patent Publication No. DE 39 39 822 A1 describes a vibration damping system for a motor vehicle having a control unit to detect interfering oscillations for generating control signals which are sent to at least one control element for operating an oscillating body disposed in the vehicle. The oscillator is used to introduce superimposing and damping phase-shifted opposing oscillations into the motor vehicle. The oscillating body is implemented by a functional element of the vehicle, e.g. battery or engine cooler, and the control element is realized by a piezo-ceramic actuator.

It would be desirable and advantageous to provide an improved dashboard support which is constructed to better realize a vibration damping in the area of the instrument panel of a motor vehicle, especially of heavy trucks.

SUMMARY OF THE INVENTION

According to one aspect of the present invention, a dashboard support for a motor vehicle includes a support beam extending between windshield pillars of a motor vehicle body; and an active arrangement, having a single-mass oscillator arranged on the support beam in an attachment area of a steering column, for implementing a vibration damping.

The present invention resolves prior art problems by integrating a single-mass oscillator for opposing vibrations generated during travel. Suitably, the control of vibration is realized spatially. Vibrations caused during travel are detected by sensors which are operatively connected to a controller for generating a compensating oscillation by the single-mass oscillator to thereby damp unwanted vibration. As a result, unwanted vibration is no longer effective and interfering vibration can be shifted to a frequency range that has no adverse impact and is not perceived.

As a major part of vibrations encountered during travel is introduced via the steering column, it may be suitable to arrange the single-mass oscillator in the attachment zone between the steering column and the support beam. The compensation of vibrations is thus realized in immediate proximity of the origin or introduction of vibrations into the motor vehicle and can take place efficiently with little energy expenditure. It may also be conceivable to arrange the single-mass oscillator underneath the steering column.

According to another feature of the present invention, the single-mass oscillator may include a housing, a mass body arranged spatially movable in the housing, and an actuator for exciting the mass body to vibrate.

According to another feature of the present invention, the actuator may be realized in the form of a piezo element. In general, a piezo element converts electric energy into mechanical energy without assistance of moving parts to thereby realize a very rapid response time while still exhibiting a long service life. The piezo effect is based on a mechanical deformity of certain embedded crystals under the influence of an electric field. This effect is used to realize an active excitation of the piezo elements via an external controller and the generation of a counter or compensating vibration in the attachment zone of steering column and support beam of the dashboard support, when the mass body in the single-mass oscillator is excited. Suitably, the piezo element(s) are realized as piezo-ceramic staple actuators.

According to another feature of the present invention, the single-mass oscillator may include a spring and damper unit, wherein the mass body is connected to the housing via the spring and damper unit and the actuator.

Dimensioning of the mass body is dependent on the vibration amplitudes and the vibration frequencies and is selected to best suit the motor vehicle at hand.

Through use of a single-mass oscillator in accordance with the present invention, a wide spectrum of counter and compensating vibrations can be realized. As a result, unwanted vibration can now be compensated more rapidly than heretofore. In particular, when heavy trucks are involved, vibrations can be actively and effectively damped.

BRIEF DESCRIPTION OF THE DRAWING

Other features and advantages of the present invention will be more readily apparent upon reading the following description of currently preferred exemplified embodiments of the invention with reference to the accompanying drawing, in which.

DETAILED DESCRIPTION OF PREFERRED EMBODIMENTS

Figure 1:
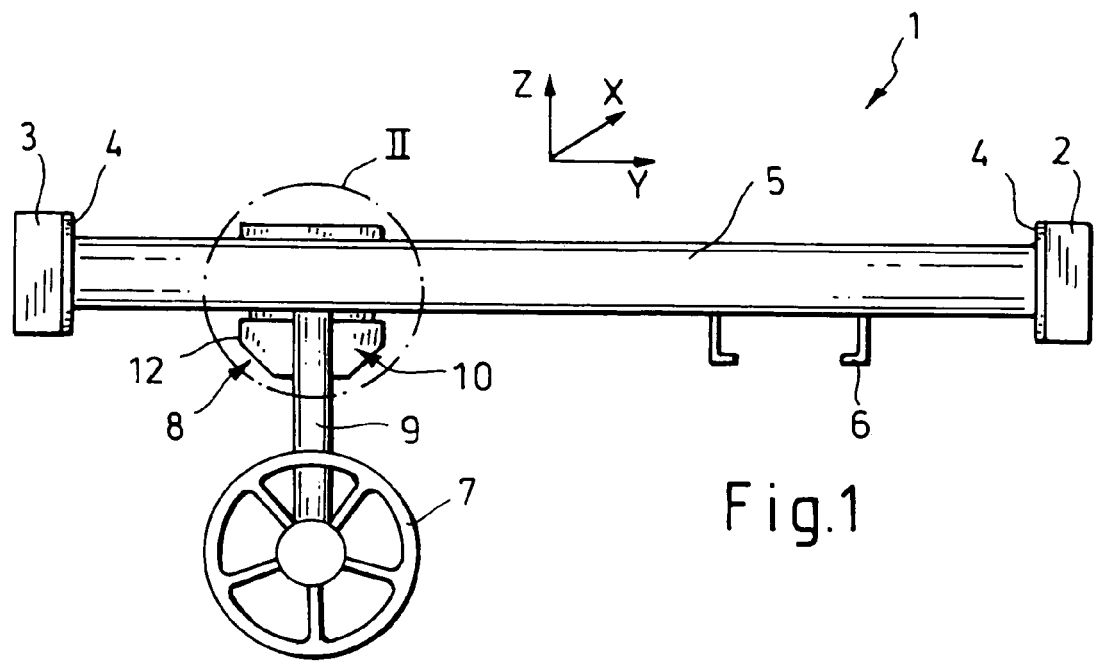
FIG. 1 is a simplified and schematic illustration of a dashboard support embodying the subject matter of the present invention.

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 1, there is shown a simplified and schematic illustration of a dashboard support, generally designated by reference numeral 1 and extending between windshield pillars 2, 3, indicated here only, of an automotive vehicle body in a direction transversely to the traveling direction of the vehicle body. The connection of the dashboard support 1 to the windshield pillars 2, 3 is realized by mountings 4 in a manner known to the artisan. The dashboard support 1 includes a support beam 5 for carrying the dashboard or instrument panel (not shown) and intended for attachment and securement of various vehicle components such as vehicle heater, ventilating and air conditioning system, airbag, center console, fuse box or glove compartment. By way of example, reference numeral 6 designates an airbag holder, while reference numeral 7 designates a steering wheel operatively connected to a steering column 9.

Figure 2:
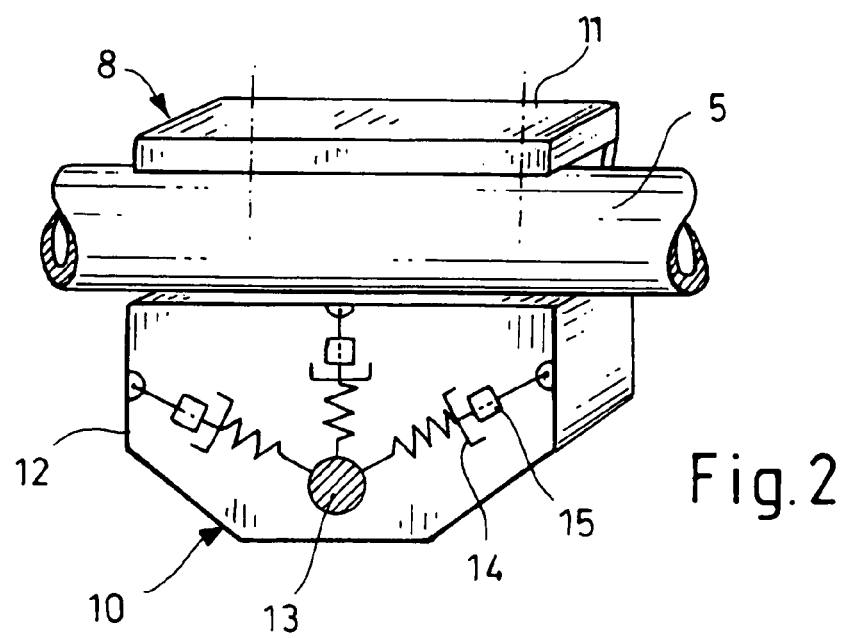
FIG. 2 is an enlarged detailed view of the area encircled in FIG. 1 and marked II.

Associated to the support beam 5 is an active arrangement for vibration damping. In accordance with the present invention, the active arrangement includes a single-mass oscillator 10 which is disposed below the steering column 9 in an attachment zone 8 of the steering column 9 and support beam 5. The attachment of the steering wheel 7 is indicated in FIG. 2 by reference numeral 11. Of course, the single-mass oscillator 10 can also be disposed between the steering column 9 and the support beam 5.

As shown in FIG. 2, the single-mass oscillator 10 includes a housing 12 and a mass body 13 which is accommodated spatially movable within the housing 12. The mass body 13 is resiliently suspended inside the housing 12 by spring and damper units 14 and actuators 15 in the form of piezo elements, such as piezo-ceramic elements. Although not shown in detail in the foregoing Figures for the sake of simplicity, the active arrangement for vibration damping further includes sensors as well as a controller and a power source for supply of voltage, typically a 12 voltage or 24 voltage power source.

During travel, the sensors measure encountered vibrations and transmit the information to the controller. The controller evaluates the information and transmits corresponding signals to the piezo elements 15. Control of the electric voltage changes the shape or thickness of the piezo elements 15, whereby a spatial vibration control in the x, y and z directions in space is possible. The movement of the piezo elements 15 causes the mass body 13 to vibrate in a controlled direction. The vibration by the mass body 13 is so targeted as to superimpose and compensate vibrations and structure-borne sound introduced during travel.

The single-mass oscillator 10 with integrated mass body 13 is able to cover a wide range of vibrations and frequency ranges. Thus, an effective damping of unwanted vibrations is realized. The unwanted vibrations is made ineffective or shifted to a frequency range that has no adverse impact and is not perceived during travel.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed is:

1. A dashboard support for a motor vehicle, comprising a support beam extending between windshield pillars of a motor vehicle body; and an active arrangement, having a single-mass oscillator, arranged in an attachment area between the support beam and a steering column, for implementing a vibration damping, said oscillator including a housing and a resiliently suspended mass body arranged in the housing.

2. The dashboard support of claim 1, wherein the single-mass oscillator is disposed underneath the steering column.

3. The dashboard support of claim 1, wherein the mass body is spatially movable in the housing, said single-mass oscillator including an actuator for causing the mass body to vibrate.

4. The dashboard support of claim 3, wherein the actuator is a piezo element.

5. The dashboard support of claim 4, wherein the piezo element is a piezo-ceramic staple actuator.

6. The dashboard support of claim 3, wherein the single-mass oscillator includes a spring and damper unit, said mass body being connected to the housing via the spring and damper unit and the actuator.

* * * * *